(12) United States Patent
Pateromichelakis et al.

(10) Patent No.: US 12,185,208 B2
(45) Date of Patent: Dec. 31, 2024

(54) ADAPTING A MANAGED ENTITY FOR AN APPLICATION

(71) Applicant: Lenovo (Singapore) Pte. Ltd., New Tech Park (SG)

(72) Inventors: Emmanouil Pateromichelakis, Viersen (DE); Ishan Vaishnavi, Munich (DE)

(73) Assignee: Lenovo (Singapore) Pte. Ltd., New Tech Park, Singapore (SG)

( * ) Notice: Subject to any disclaimer, the term of this patent is extended or adjusted under 35 U.S.C. 154(b) by 0 days.

(21) Appl. No.: 18/250,897

(22) PCT Filed: Oct. 27, 2020

(86) PCT No.: PCT/EP2020/080149
§ 371 (c)(1),
(2) Date: Apr. 27, 2023

(87) PCT Pub. No.: WO2022/089725
PCT Pub. Date: May 5, 2022

(65) Prior Publication Data
US 2023/0403543 A1  Dec. 14, 2023

(51) Int. Cl.
*G06F 15/177* (2006.01)
*H04L 41/0686* (2022.01)
*H04L 47/2475* (2022.01)
*H04W 4/50* (2018.01)

(52) U.S. Cl.
CPC .......... *H04W 4/50* (2018.02); *H04L 41/0686* (2013.01); *H04L 47/2475* (2013.01)

(58) Field of Classification Search
CPC ... H04W 4/50; H04L 41/0686; H04L 47/2475
USPC ......................................... 709/220, 223, 224
See application file for complete search history.

(56) References Cited

U.S. PATENT DOCUMENTS

| | | | | |
|---|---|---|---|---|
| 6,044,372 A | * | 3/2000 | Rothfus | G06Q 10/10 709/212 |
| 6,385,609 B1 | * | 5/2002 | Barshefsky | H04Q 3/0087 |
| 8,200,743 B2 | * | 6/2012 | Lee | H04L 41/0695 709/224 |
| 8,719,399 B2 | * | 5/2014 | Harrang | H04L 1/0038 709/224 |

(Continued)

OTHER PUBLICATIONS

5G ACIA: "Exposure of 5G Capabilities for Connected Industries and Automation Applications", May 2020, ZVEI—German Electrical and Electronic Manufacturers' Association 5G ACIA, p. 1-28, https://5g-acia.org/wp-content/uploads/2021/04/5G-ACIA_Exposure_of_5G_Capabilities_Download-1.pdf (Year: 2020).*

(Continued)

*Primary Examiner* — Liang Che A Wang
(74) *Attorney, Agent, or Firm* — Kunzler Bean & Adamson

(57) ABSTRACT

Apparatuses, methods, and systems are disclosed for adapting a managed entity for an application. One method includes obtaining an association of a management service to an application. The method includes receiving a trigger event report for adapting service requirements for the application. The method includes, in response to the trigger event report, determining an adaptation of a managed entity for the application. The method includes transmitting the adaptation of the managed entity to a management service producer of the management service.

16 Claims, 6 Drawing Sheets

(56) References Cited

U.S. PATENT DOCUMENTS

2010/0120410 A1* 5/2010 Fan ............... H04M 3/4228
455/419
2010/0174949 A1* 7/2010 Athey ............... G06Q 30/02
714/39

OTHER PUBLICATIONS

PCT/EP2020/080149, "Notification of Transmittal of the International Search Report and the Written Opinion of the International Searching Authority, or the Declaration", International Searching Authority, May 31, 2021, pp. 1-13.
5GACIA, "Exposure of 5G Capabilities for Connected Industries and Automation Applications", 5G Alliance for Connected Industries and Automation (5G-ACIA), a Working Party of ZVEI, May 2020, pp. 1-28.
ETSI, "Zero-touch network and Service Management (ZSM); Reference Architecture", ETSI GS ZSM 002 V1.1.1, Aug. 2019, pp. 1-80.
Qualcomm Inc., "New SID: Study on 5G Networks Providing Access to Localized Services", 3GPP TSG-SA WG1 Meeting #91-e S1-203276, Aug. 24-Sep. 2, 2020, pp. 1-3.
CATT, "Solution on the service capability exposure to the EAS", 3GPP TSG-SA3 Meeting #100bis-e S3-202779, Oct. 12-16, 2020, pp. 1-2.
SA WG6, "Presentation of TR 23.745 v1.0.0 for information", 3GPP TSG-SA Meeting #89-E SP-200829, Sep. 15-21, 2020, pp. 1-2.
3GPP, "3rd Generation Partnership Project; Technical Specification Group Services and System Aspects; Study on application layer support for Factories of the Future in 5G network; (Release 17)", 3GPP TR 23.745 V1.0.0, Sep. 2020, pp. 1-57.
3GPP, "3rd Generation Partnership Project; Technical Specification Group Services and System Aspects; Study on application layer support for Unmanned Aerial Systems (UAS); (Release 17)", 3GPP TR 23.755 V0.10.0, Sep. 2020, pp. 1-39.
3GPP, "3rd Generation Partnership Project; Technical Specification Group Services and System Aspects; Study on enhancements to application layer support for V2X services; (Release 17)", 3GPP TR 23.764 V17.0.0, Sep. 2020, pp. 1-61.
3GPP, "3rd Generation Partnership Project; Technical Specification Group Services and System Aspects; Service requirements for cyber-physical control applications in vertical domains; Stage 1 (Release 17)", 3GPP TS 22.104 V17.3.0, Jul. 2020, pp. 1-76.
3GPP, "3rd Generation Partnership Project; Technical Specification Group Services and System Aspects; Application layer support for Vehicle-to-Everything (V2X) services; Functional architecture and information flows; (Release 16)", 3GPP TS 23.286 V16.4.0, Sep. 2020, pp. 1-64.
3GPP, "3rd Generation Partnership Project; Technical Specification Group Services and System Aspects; Service Enabler Architecture Layer for Verticals (SEAL); Functional architecture and information flows; (Release 16)", 3GPP TS 23.434 V16.5.0, Sep. 2020, pp. 1-123.
3GPP, "3rd Generation Partnership Project; Technical Specification Group Services and System Aspects; System architecture for the 5G System (5GS); Stage 2 (Release 16)", 3GPP TS 23.501 V16.5.0, Jul. 2020, pp. 1-441.
3GPP, "3rd Generation Partnership Project; Technical Specification Group Services and System Aspects; Architecture for enabling Edge Applications; (Release 17)", 3GPP TS 23.558 V1.0.0, Sep. 2020, pp. 1-103.
3GPP, "3rd Generation Partnership Project; Technical Specification Group Services and System Aspects; Management and orchestration; Concepts, use cases and requirements (Release 16)", 3GPP TS 28.530 V16.3.0, Sep. 2020, pp. 1-30.
3GPP, "3rd Generation Partnership Project; Technical Specification Group Services and System Aspects; Management and orchestration; Generic management services; (Release 16)", 3GPP TS 28.532 V16.5.0, Sep. 2020, pp. 1-246.
3GPP, "3rd Generation Partnership Project; Technical Specification Group Services and System Aspects; Management and orchestration; Architecture framework (Release 16)", 3GPP TS 28.533 V16.5.0, Sep. 2020, pp. 1-30.
3GPP, "3rd Generation Partnership Project; Technical Specification Group Radio Access Network; NR; NR and NG-RAN Overall Description; Stage 2 (Release 16)", 3GPP TS 38.300 V16.2.0, Jul. 2020, pp. 1-148.

* cited by examiner

ADAPTING A MANAGED ENTITY FOR AN APPLICATION

FIELD

The subject matter disclosed herein relates generally to wireless communications and more particularly relates to adapting a managed entity for an application.

BACKGROUND

The following abbreviations are herewith defined, at least some of which are referred to within the following description: Third Generation Partnership Project ("3GPP"), 5$^{th}$ Generation ("5G"), 5G System ("5GS"), 5G QoS Indicator ("5QI"), Authentication, Authorization, and Accounting ("AAA"), Positive-Acknowledgment ("ACK"), Application Function ("AF"), Automated Guided Vehicles ("AGV"), Artificial Intelligence ("AI"), Authentication and Key Agreement ("AKA"), Aggregation Level ("AL"), Access and Mobility Management Function ("AMF"), Angle of Arrival ("AoA"), Angle of Departure ("AoD"), Access Point ("AP"), Application Programmable Interface ("API"), Augmented Reality ("AR"), Access Stratum ("AS"), Application Service Provider ("ASP"), Autonomous Uplink ("AUL"), Authentication Server Function ("AUSF"), Authentication Token ("AUTN"), Background Data ("BD"), Background Data Transfer ("BDT"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Control to Control ("C2C"), Cell RNTI ("C-RNTI"), Carrier Aggregation ("CA"), Channel Access Priority Class ("CAPC"), Channel Busy Ratio ("CBR"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Configured Grant ("CG"), Closed-Loop ("CL"), Core Network ("CN"), Coordinated Multipoint ("CoMP"), Category of Requirements ("CoR"), Channel Occupancy Time ("COT"), Cyclic Prefix ("CP"), Channel Quality Indicator ("CQI"), Cyclical Redundancy Check ("CRC"), Communication Service ("CS"), Channel State Information ("CSI"), Channel State Information-Reference Signal ("CSI-RS"), Common Search Space ("CSS"), Control Resource Set ("CORESET"), Discrete Fourier Transform Spread ("DFTS"), Dual Connectivity ("DC"), Downlink Control Information ("DCI"), Downlink Feedback Information ("DFI"), Downlink ("DL"), Demodulation Reference Signal ("DMRS"), Data Network ("DN"), Data Network Name ("DNN"), Data Radio Bearer ("DRB"), Discontinuous Reception ("DRX"), Dedicated Short-Range Communications ("DSRC"), Downlink Pilot Time Slot ("DwPTS"), Enhanced Clear Channel Assessment ("eCCA"), Enhanced Mobile Broadband ("eMBB"), Evolved Node B ("eNB"), Enhanced V2X ("eV2X"), Extensible Authentication Protocol ("EAP"), Edge Configuration Server ("ECS"), Edge Enabler Client ("EEC"), Edge Enabler Server ("EES"), Enhanced ICIC ("eICIC"), Effective Isotropic Radiated Power ("EIRP"), Evolved Packet System ("EPS"), European Telecommunications Standards Institute ("ETSI"), Factories of the Future Application Enabler ("FAE"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Factory of the Future ("FF"), Frequency Range 1—sub 6 GHz frequency bands and/or 410 MHz to 7125 MHz ("FR1"), Frequency Range 2—24.25 GHz to 52.6 GHz ("FR2"), Universal Geographical Area Description ("GAD"), Guaranteed Bit Rate ("GBR"), Guaranteed Flow Bit Rate ("GFBR"), Group Leader ("GL"), 5G Node B or Next Generation Node B ("gNB"), Global Navigation Satellite System ("GNSS"), General Packet Radio Services ("GPRS"), Guard Period ("GP"), Global Positioning System ("GPS"), Generic Public Subscription Identifier ("GPSI"), Global System for Mobile Communications ("GSM"), Generic Network Slice Template ("GST"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Hash Expected Response ("HXRES"), Inter-cell Interference Coordination ("ICIC"), Identity or Identifier ("ID"), Information Element ("IE"), Industrial Internet of Things ("IIoT"), International Mobile Equipment Identity ("IMEI"), International Mobile Subscriber Identity ("IMSI"), International Mobile Telecommunications ("IMT"), Internet-of-Things ("IoT"), Intelligent Transportation Systems ("ITS"), Key Performance Indicator ("KPI"), Layer 1 ("L1"), Layer 2 ("L2"), Layer 3 ("L3"), Licensed Assisted Access ("LAA"), Local Area Data Network ("LADN"), Local Area Network ("LAN"), Load Based Equipment ("LBE"), Listen-Before-Talk ("LBT"), Logical Channel ("LCH"), Logical Channel Group ("LCG"), Logical Channel Prioritization ("LCP"), Log-Likelihood Ratio ("LLR"), Level of Automation ("LoA"), Line of Sight ("LOS"), Long Term Evolution ("LTE"), LTE Vehicle ("LTE-V"), Multiple Access ("MA"), Medium Access Control ("MAC"), Multimedia Broadcast Multicast Services ("MBMS"), Maximum Bit Rate ("MBR"), Minimum Communication Range ("MCR"), Modulation Coding Scheme ("MCS"), Management Domain ("MD"), Managed Element ("ME"), Mobile Edge Computing ("MEC"), Management Function ("MF"), Master Information Block ("MIB"), Massive IoT ("mIoT"), Multiple Input Multiple Output ("MIMO"), Machine Learning ("ML"), Mobility Management ("MM"), Mobility Management Entity ("MME"), Master Node ("MN"), Management Service ("MnS"), Mobile Network Operator ("MNO"), Mobile Originated ("MO"), Management Object Instances ("MOI"), Mean Opinion Score ("MOS"), massive MTC ("mMTC"), Maximum Power Reduction ("MPR"), Multi-Radio Dual Connectivity ("MR-DC"), Machine Type Communication ("MTC"), Multi User Shared Access ("MUSA"), Non Access Stratum ("NAS"), Narrowband ("NB"), Negative-Acknowledgment ("NACK") or ("NAK"), New Data Indicator ("NDI"), Network Entity ("NE"), Network Exposure Function ("NEF"), Network Exposure Function/Service Capability Exposure Function ("NEF/SCEF"), NEtwork Slice Type ("NEST"), Network Function ("NF"), Non-LOS ("NLOS"), Next Generation ("NG"), NG 5G S-TMSI ("NG-5G-S-TMSI"), Neural Networks ("NN"), Non-Orthogonal Multiple Access ("NOMA"), Non Public Network ("NPN"), New Radio ("NR"), NR Unlicensed ("NR-U"), Network Repository Function ("NRF"), Network Slice as a Service (NsaaS), Network Scheduled Mode ("NS Mode") (e.g., network scheduled mode of V2X communication resource allocation—Mode-1 in NR V2X and Mode-3 in LTE V2X), Network Slice Instance ("NSI"), Network Slice Selection Assistance Information ("NSSAI"), Network Slice Selection Function ("NSSF"), Network Slice Subnet Instance ("NSSI"), Network Slice Selection Policy ("NSSP"), Operation, Administration, and Maintenance System or Operation and Maintenance Center ("OAM"), Original Equipment Manufacturer ("OEM"), Orthogonal Frequency Division Multiplexing ("OFDM"), Open-Loop ("OL"), Operator Defined Open and Intelligent Radio Access Networks ("O-RAN"), Other System Information ("OSI"), Over-the-top ("OTT"), Power Angular Spectrum ("PAS"), Physical Broadcast Channel ("PBCH"), Power Control ("PC"), UE to UE interface ("PC5"), Principal Component Analysis ("PCA"), Policy and Charging Control ("PCC"), Primary Cell ("PCell"), Policy and Charging Rules Function ("PCRF"), Policy Control Function ("PCF"), Physical Cell Identity ("PCI"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), Precoding Matrix Index ("PMI"), Physical Network Function ("PNF"), Prose Per Packet Priority ("PPPP"), Prose Per Packet Reliability ("PPPR"), PC5 5QI ("PQIs"), Predictive QoS ("P-QoS"), Physical Random Access Channel ("PRACH"), Physical Resource Block ("PRB"), Proximity Services ("ProSe"), Positioning Reference Signal ("PRS"), Physical Sidelink Control Channel ("PSCCH"), Primary Secondary Cell ("PSCell"), Physical Sidelink Feedback Control Channel ("PSFCH"), Physical Uplink Control Channel ("PUCCH"), Physical Uplink Shared Channel ("PUSCH"), QoS Class Identifier ("QCI"), Quasi Co-Located ("QCL"), QoS Flow Indicator ("QFI"), Quality of Experience ("QoE"), Quality of Service ("QoS"), Quadrature Phase Shift Keying ("QPSK"), Registration Area ("RA"), RA RNTI ("RA-RNTI"), Radio Access Network ("RAN"), Random ("RAND"), Radio Access Technology ("RAT"), Serving RAT ("RAT-1") (serving with respect to Uu), Other RAT ("RAT-2") (non-serving with respect to Uu), Random Access Procedure ("RACH"), Random Access Preamble Identifier ("RAPID"), Random Access Response ("RAR"), Resource Block Assignment ("RBA"), Resource Element Group ("REG"), Rank Indicator ("RI"), RAN Intelligent Controller ("RIC"), Radio Link Control ("RLC"), RLC Acknowledged Mode ("RLC-AM"), RLC Unacknowledged Mode/Transparent Mode ("RLC-UM/TM"), Radio Link Failure ("RLF"), Radio Link Monitoring ("RLM"), Radio Network Information ("RNI"), RNI Service ("RNIS"), Radio Network Temporary Identifier ("RNTI"), Reference Signal ("RS"), Recursive Model ("RM"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Received Signal Strength Indicator ("RSSI"), Real Time ("RT"), Round Trip Time ("RTT"), Receive ("RX"), Service Capability Exposure Function ("SCEF"), Sparse Code Multiple Access ("SCMA"), Service Management and Orchestration ("SMO"), Service Provider ("SP"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sidelink Control Information ("SCI"), Sub-carrier Spacing ("SCS"), Service Data Unit ("SDU"), Security Anchor Function ("SEAF"), Service Enabler Architecture Layer ("SEAL"), Sidelink Feedback Content Information ("SFCI"), Serving Gateway ("SGW"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Sidelink ("SL"), Service Level Agreement ("SLA"), Sidelink Synchronization Signals ("SLSS"), Session Management ("SM"), Session Management Function ("SMF"), Secondary Node ("SN"), Special Cell ("SpCell"), Single Network Slice Selection Assistance Information ("S-NSSAI"), Scheduling Request ("SR"), Signaling Radio Bearer ("SRB"), Shortened TMSI ("S-TMSI"), Shortened TTI ("sTTI"), Synchronization Signal ("SS"), Sidelink CSI RS ("S-CSI RS"), Sidelink PRS ("S-PRS"), Sidelink SSB ("S-SSB"), Synchronization Signal Block ("SSB"), Subscription Concealed Identifier ("SUCI"), Scheduling User Equipment ("SUE"), Supplementary Uplink ("SUL"), Subscriber Permanent Identifier ("SUPI"), Support Vector Machine ("SVM"), Tracking Area ("TA"), TA Identifier ("TAI"), TA Update ("TAU"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Temporary Mobile Subscriber Identity ("TMSI"), Time of Flight ("ToF"), Transmission Power Control ("TPC"), Transmission Reception Point ("TRP"), Time Sensitive Networking ("TSN"), Transmission Time Interval ("TTI"), Transmit ("TX"), UAS Application Enabler ("UAE"), Unmanned Aircraft System ("UAS"), Uplink Control Information ("UCI"), Unified Data Management Function ("UDM"), Unified Data Repository ("UDR"), User Entity/Equipment (Mobile Terminal) ("UE") (e.g., a V2X UE), UE Autonomous Mode (UE autonomous selection of V2X communication resource—e.g., Mode-2 in NR V2X and Mode-4 in LTE V2X. UE autonomous selection may or may not be based on a resource sensing operation), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Vehicle-to-Vehicle ("V2V"), Vehicle-to-Everything ("V2X"), V2X Control Function ("V2XCF"), V2X UE (e.g., a UE capable of vehicular communication using 3GPP protocols), V2X Application Enabler ("VAE"), Vertical Application Layer ("VAL"), Visiting AMF ("vAMF"), Virtual Network Function ("VNF"), Visiting NSSF ("vNSSF"), Visiting PLMN ("VPLMN"), Virtual Reality ("VR"), Wide Area Network ("WAN"), and Worldwide Interoperability for Microwave Access ("WiMAX").

In certain wireless communications networks, managed entity configurations may be used.

BRIEF SUMMARY

Methods for adapting a managed entity for an application are disclosed. Apparatuses and systems also perform the functions of the methods. One embodiment of a method includes obtaining an association of a management service to an application. In some embodiments, the method includes receiving a trigger event report for adapting service requirements for the application. In various embodiments, the method includes, in response to the trigger event report, determining an adaptation of a managed entity for the application. In certain embodiments, the method includes transmitting the adaptation of the managed entity to a management service producer of the management service.

One apparatus for adapting a managed entity for an application includes a processor that obtains an association of a management service to an application. In various embodiments, the apparatus includes a receiver that receives a trigger event report for adapting service requirements for the application. In certain embodiments, the apparatus includes a transmitter. In some embodiments, the processor, in response to the trigger event report, determines an adaptation of a managed entity for the application; and the transmitter transmits the adaptation of the managed entity to a management service producer of the management service.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
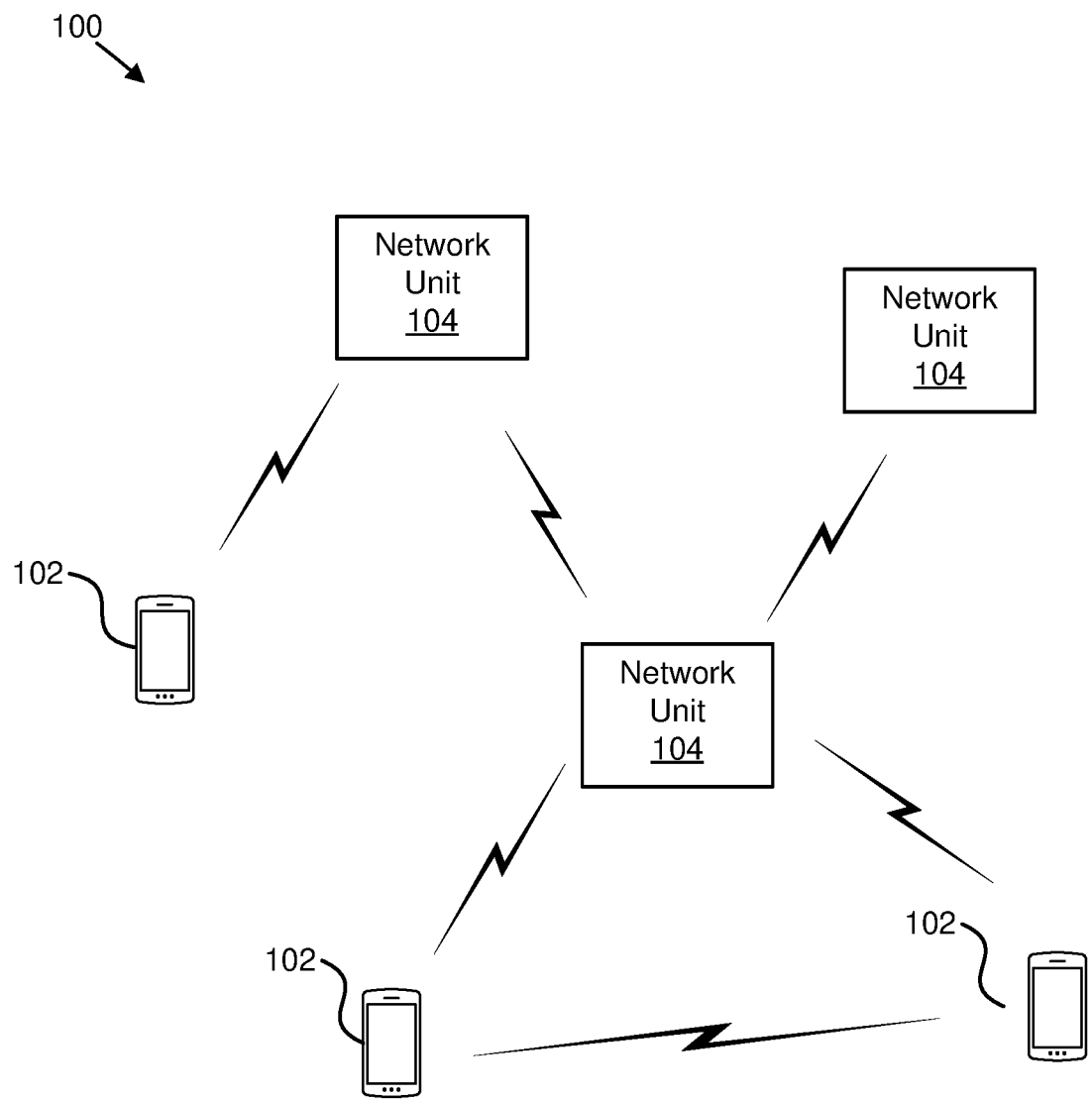
FIG. 1 is a schematic block diagram illustrating one embodiment of a wireless communication system for adapting a managed entity for an application.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for adapting a managed entity for an application. In one embodiment, the wireless communication system 100 includes remote units 102, and network units 104. Even though a specific number of remote units 102, and network units 104 are depicted in FIG. 1, one of skill in the art will recognize that any number of remote units 102, and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, an OAM, an SMF, a UPF, an application function, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may obtain an association of a management service to an application. In some embodiments, the network unit 104 may receive a trigger event report for adapting service requirements for the application. In various embodiments, the network unit 104 may, in response to the trigger event report, determine an adaptation of a managed entity for the application. In certain embodiments, the network unit 104 may transmit the adaptation of the managed entity to a management service producer of the management service. Accordingly, the network unit 104 may be used for adapting a managed entity for an application.

Figure 2:
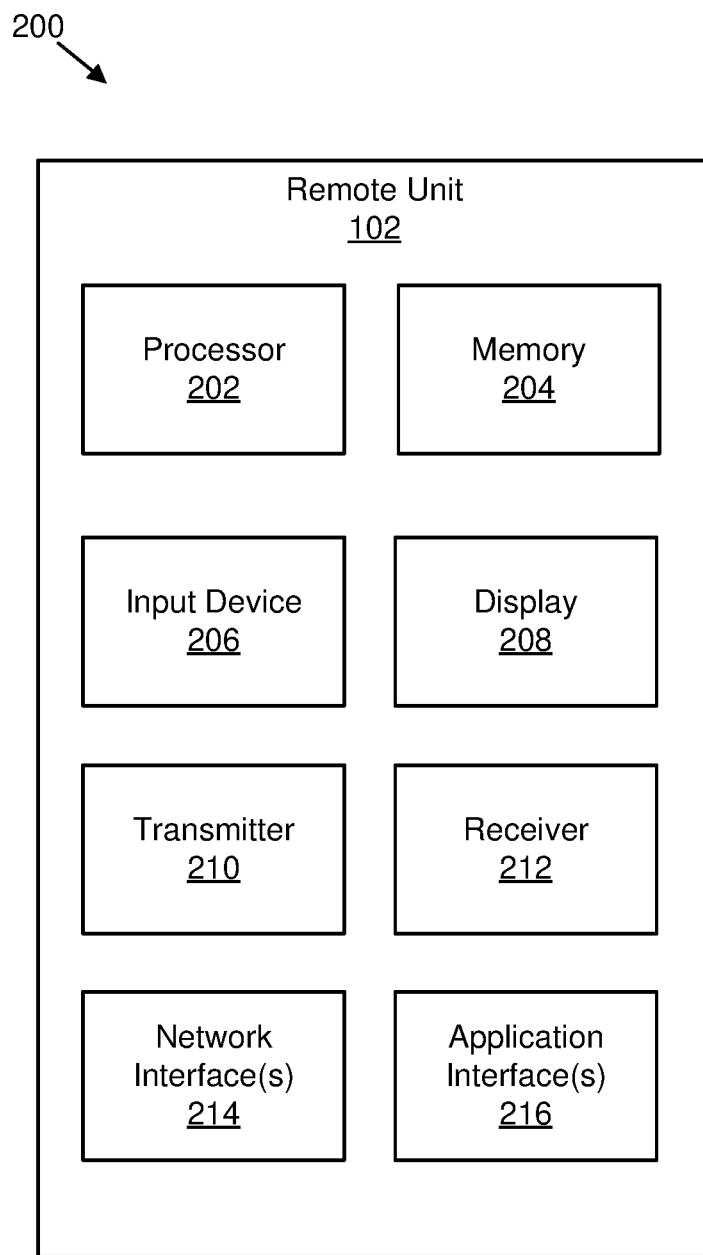
FIG. 2 is a schematic block diagram illustrating one embodiment of an apparatus that may be used for adapting a managed entity for an application.

FIG. 2 depicts one embodiment of an apparatus 200 that may be used for adapting a managed entity for an application. The apparatus 200 includes one embodiment of the remote unit 102. Furthermore, the remote unit 102 may include a processor 202, a memory 204, an input device 206, a display 208, a transmitter 210, a receiver 212, one or more network interfaces 214, and one or more application interfaces 216. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
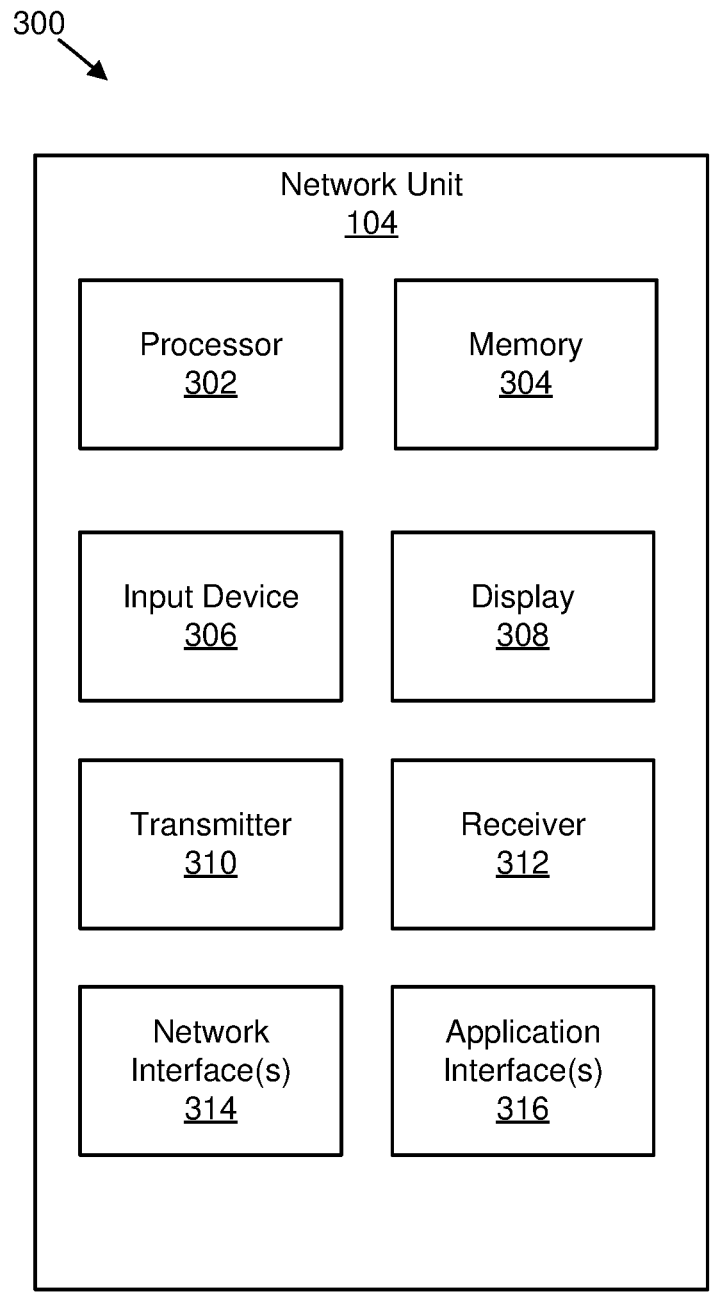
FIG. 3 is a schematic block diagram illustrating one embodiment of an apparatus that may be used for adapting a managed entity for an application.

FIG. 3 depicts one embodiment of an apparatus 300 that may be used for adapting a managed entity for an application. The apparatus 300 includes one embodiment of the network unit 104. Furthermore, the network unit 104 may include a processor 302, a memory 304, an input device 306, a display 308, a transmitter 310, a receiver 312, one or more network interfaces 314, and one or more application interfaces 316. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the processor 302 may obtain an association of a management service to an application. In various embodiments, the receiver 312 may receive a trigger event report for adapting service requirements for the application. In some embodiments, the processor 302, in response to the trigger event report, may determine an adaptation of a managed entity for the application; and the transmitter 310 may transmit the adaptation of the managed entity to a management service producer of the management service.

In various embodiments, the discovery and exposure of slice management services may be enabled to allow an application service provider to configure slice parameters for users running an application.

In certain embodiments, network slicing is a key feature (e.g., 5G). In such embodiments, network slicing may introduce logical end-to-end sub-networks corresponding to different verticals. In some embodiments, network slicing may enable the deployment of multiple logical networks known as network slice instances offering 3rd parties and verticals customized communication services on the top of a shared infrastructure. In various embodiments, based on a physical network that might be operated by a public operator or an enterprise, 5G may provide the means to run multiple slices for different communication purposes. In certain embodiments, 5G may enable slices to be independently run and/or isolated from one another.

In some embodiments, a network slice instance (e.g., private or public slice) may include a RAN part and/or a CN part. In various embodiments, a sub-part of a network slice instance may be called a network slice subnet instance (NSSI) which may contain further NSSI.

In certain embodiments, there may be application support for slices, such as in 3GPP 5GS. In some embodiments, an application may use any one of the following managed entities: CS, NSI, NSSI, network functions or other resources in telecom networks such as virtualized network function and/or physical entities such as PNFs.

In various embodiments, there may be slice access with application preference. In certain embodiments, there may be scenarios in which applications (e.g., gaming applications, online video applications, etc.) may access 5GS over multiple slices for different services (e.g., based on user membership) and/or applications may have different priorities on different slices based on an ASP request. In some embodiments, different slices may be available in all provided frequencies or a sub-set of them (e.g., FR1 or FR2 only) based on MNO and ASP agreement and/or network capabilities to support a slice requirement.

In certain embodiments, a mobile network operator has provisioned a set of network slices (e.g., Slice #1, Slice #2, Slice #3) which may be used by different ASPs (e.g., Slice #1 for online video services, Slice #2 for gaming, Slice #3 for eMBB or IOT service).

In some embodiments, different ASPs may use slices (or a subset of them) for different services that they offer. Furthermore, in certain embodiments, if an application changes network slices to be accessed, the application may be agnostic to UEs accessing service and/or may be performed automatically.

In one example, users A and B (e.g., using UE1 and UE2 respectively) have installed game applications and video applications and may have high priorities based on their membership to the video and game services. The high priorities may enable the users A and B to connect automatically to Slice #1 and Slice #2 to guarantee their QoS compared with other users having a lower priority. The priority over the slices to be used by UE1 and UE2 may change based on an ASP request (e.g., a UE moves to a different service area or an area in which a certain frequency is not available, different slice load conditions, or 3rd party ASP rolls out new services and/or applications and the user membership changes).

In various embodiments, a dynamic interaction between an MNO (e.g., management system of a 5GS operator) and an ASP may be for: 1) negotiating slice provisioning parameters (e.g., NSI and/or NSSI configuration) of subscribed slices (e.g. Slice #1, Slice #2, Slice #3); 2) enabling exposure of management services to the ASP (e.g., related to the subscribed slices for allowing the ASP to monitor and manage the slices used by the UEs); and/or 3) enabling the ASP to negotiate slice access priorities related to different service profiles.

In some embodiments, there may be multi-slicing support in FF scenarios. In certain embodiments, such as in FF scenarios, different deployment models may be considered (e.g., NPN vs PLMN with private slices). A PLMN with private slices may be seen as a semi-private network via network slicing in which a mobile network operator uses network slicing to create a semi-private 5G network for a manufacturer. In various embodiments, there is flexibility in tuning technical capabilities of a product to meet connectivity needs.

In certain embodiments, such as in a FF with slicing support, multiple slices may be deployed to support one or more applications: 1) for different areas inside a factory (e.g., control room, factory floor, outdoors, etc.) there may be different service requirements for an application which may be accommodated by different slices; 2) for different traffic types in which isolation may be important due to deterministic traffic requirements (e.g., TSN vs non-TSN traffic may require differentiated handling which includes different traffic routing policies and application to DN association)—in particular, TSN may be a use case with deterministic KPIs (where the 5GS is seen as a L2 bridge), and the non-TSN traffic may be URLLC, eMBB, and/or mIoT traffic, for example—for such scenarios, TSN traffic may be accommodated by a different slice due to the deterministic requirements and different user-plane and/or control-plane handling; 3) for an application which requires different interactions with a PLMN for a control plane (e.g., autonomous C2C vs remote C2C)—C2C communication may be used if devices with separate controllers interact to perform a shared task (e.g., this may be local and/or autonomous if the controllers are in vicinity; or remote if servicing and/or maintenance is needed)—for such scenarios, remote C2C communication may be deployed as a new slice (e.g., since the UP and CP may differ end-to-end); and/or 4) for different communication models that may be mapped to an application, different slices may be pre-customized and/or deployed on demand to enable a fast change from one communication model to another for the same application, but with a different service profile—these communication models may be the following: line to controller, controller to controller, controller to device, and/or device to compute.

In various embodiments, there may be a mobile robot and/or AGV scenario. Such embodiments may involve multiple application services that are onboarded at a mobile robot for serving a particular cause, such as: 1) motion controls; 2) sensors for environment related measurements; 3) video streaming upload to a remote controller (e.g., video sensor sharing); 4) performing a manufacturing task (e.g., cooperative carrying); and/or TSN vs non-TSN types of services.

In some embodiments, different applications may be onboarded and may belong to different stakeholders (e.g., OEM, OTT, factory owner, MNO) with different performance and network slice requirements. In such embodiments, different ASPs may have preference on some slices for allowing mobile robot devices to access different services (e.g., Slice #1 for motion control applications, Slice #2 for video applications, Slice #3 for cooperative carrying services).

In certain embodiments, an MNO and an ASP may negotiate application to slice mapping options, priorities over slices for different services, monitoring of slice provisioning parameters, and/or a level of exposure needed based on ASP requirement.

In various embodiments, dynamic interaction between an MNO (e.g., management system of a 5GS operator) and an ASP may be used for: 1) negotiating slice provisioning parameters (e.g., NSI and/or NSSI configuration) of subscribed slices; 2) enabling exposure of management services to the ASP (e.g., related to the subscribed slices for allowing the ASP to monitor and manage the slices used by UEs); and/or enabling the ASP to negotiate slice access priorities related to different service profiles.

In some embodiments, 5G networks may provide access to localized and event-based services. Certain embodiments may be used for areas like a stadium, an arena, an airport, a university campus, a convention center, and so forth. In such embodiments, a cellular network may be deployed or available locally for a given time period on demand or for a temporary event (e.g., a football match at a stadium). Moreover, in such embodiments, services may be offered by a MNO, other mobile operators, and/or a third party service provider.

In various embodiments, multiple applications may be possible by different ASPs or by a network operator covering: 1) premium connectivity for real-time games; 2) video services on demand (e.g., match replays from different cameras and/or drones at a stadium); 3) augmented reality and/or virtual reality services at a gaming fair; 4) on demand services at a movie theater, commercial ads in shopping malls, and so forth; and/or 5) high quality multimedia telephony and/or streaming for on-campus or remote live events and/or concerts.

In some embodiments, the use of slicing for offering one or more services on demand access to users (e.g., which may belong to different PLMNs) is an example for using NSaaS.

In certain embodiments, there may be different possibilities based on a deployment model: 1) an ASP provides a service in an MNO-deployed and operated network; 2) an ASP provides a service in a third party service provider-provided and operated network; 3) an MNO provides a service in another MNO deployed and operated network; and/or 4) an MNO provides a service in a service provider deployed and operated network. For such embodiments, the involved players (e.g., MNO, ASP, SP) may need to negotiate service level agreements and/or service provisioning aspects. By using a slice as a service concept, an MNO or third party SP may provide multiple slices for accommodating different services (e.g., provided by one or more ASPs) and offer these slices as a service to the ASPs.

In various embodiments, there may be a dynamic interaction between an operator's management system (e.g., MNO's management system or third party SP management system) and ASPs for: 1) negotiating slice provisioning parameters (e.g., NSI/NSSI configuration) of subscribed slices (e.g., Slice #1 for match replays, Slice #2 for AR/VR services, Slice #3 for premium connectivity); 2) enabling exposure of management services to the ASP (e.g., related to subscribed slices for allowing the ASP to monitor and manage the slices used by UEs); and/or 3) allowing the ASP to negotiate slice access priorities related to different service profiles (e.g., based on event requirements such as attendance at an event and/or importance of an event).

In some embodiments, an application may have a preference over certain slices to accommodate one or more services which may have different performance requirements and network requirements (e.g., different RATs or frequencies). In such embodiments, an application service provider (e.g., slice customer) may be able to: 1) discover offered slices and/or for which type of services, RATs, and/or frequencies these could be used; 2) discover management services which may be exposed as part of offered slices; and/or 3) have a means of communicating with an MNO a request for NSI and/or NSSI adaptation based on application requirements.

As used herein, non-RT RIC may mean: a logical function that enables non-real-time control and optimization of RAN elements and resources, AI/ML workflow including model training and updates, and policy-based guidance of applications and/or features in Near-RT RIC.

Moreover, as used herein, near-RT RIC and framework functions may mean: a logical function that enables near-real-time control and optimization of RAN elements and resources via fine-grained (e.g., UE basis, cell basis) data collection and actions over an E2 interface. Near-RT RIC may include near-RT RIC basic and/or framework functions which may include subscription management, conflict mitigation, E2 termination ("E2T"), and/or management services.

Furthermore, as used herein, management Services of an RIC platform may include Life-Cycle Management ("LCM") of an xApp and/or fault, configuration, accounting, performance, security ("FCAPS") management of Near-RT RIC. These services may be provided by a near-RT RIC to an xApp (e.g., via Open API) or from an SMO (Non-RT RIC) to xApps (via O1).

An xApp as used herein may mean: an application designed to run on a Near-RT RIC. Such an application may be likely to include one or more microservices and at a point of on-boarding may identify which data it consumes and which data it provides. The xApp application is independent of a Near-RT RIC and may be provided by any third party. E2 may enable a direct association between the xApp and RAN functionality.

Moreover, as used herein rApp may mean: an application similar to xApp which is designed to run on a Non-RT RIC. Furthermore, A1 may be an interface between non-RT RIC and Near-RT RIC to enable policy-driven guidance of Near-RT RIC applications and/or functions, and may support AI and/or ML workflow. E2 may refer to an interface connecting a Near-RT RIC and a NR system. Moreover, O1 may refer to an interface between orchestration & management entities and O-RAN managed elements.

In various embodiments, an E2 Node may be a logical node terminating an E2 interface. Moreover, in some embodiments, open API may be an interface between framework functions and xAPPs.

In certain embodiments, a method for slice management service discovery and exposure for an application entity outside an MNO management system (e.g., application enabler server, xApp, rApp, RIC function—such as near-RT RIC and/or non-RT RIC) may be used to support slice enablement for vertical applications. In such embodiments, the method may include: 1) as a precondition an application may be preregistered to use certain a MF (e.g., an implementation of MnS) and/or may have access to management data or MOIs from a telecom management system (e.g., this may be done by having the application register with a telecom management system); 2) there may be a trigger event—in other words, a slice enabling application entity may receive a trigger event which can be one of the following: a) an application service provider requests a new or modified service requirement and/or profile for the application; b) an OAM and/or slice management system may send a monitoring report for one or more NSIs (e.g., stating that the NSI congestion and/or load has changed, or the NSI performance is expected to change due to a changed demand); c) the OAM and/or domain-specific slice management system sends a monitoring report for one or more NSSIs (e.g., stating that a RAN-NSSI congestion and/or load has changed, or the RAN NSI performance is expected to change due to changed access demand)—for RAN-NSSI, this may also include RAN slice monitoring information relating to one or more supported frequencies (e.g., FR1, FR2) for respective slices); and d) a user (e.g., which is mapped to a managed slice) provides a trigger event indicating possible QoS degradation, congestion, RAT and/or frequency availability change or expected mobility to a different service area—this information may come from the application of the UE or from the AS layer; 3) based on the received trigger event, a slice enabling application entity decides to execute a life cycle change on the one or more of the following managed entities: a communication service, an NSI, an NSSI, or an NF for affected slices—examples of life cycle changes may include provisioning a new managed entity, and/or modification or termination of an existing managed entity—the criterion for selecting a management action may facilitate meeting existing or new application service requirements (e.g., QoE requirements, QoS requirements, GST and/or NEST attributes) considering also slice availability and/or capabilities (e.g., RATs supported per slice, frequencies supported per slice, application types which are supported per slice, etc.)—one example can be a request for more bandwidth for a RAN-NSSI or a change to a different frequency band; 4) a slice enabling application entity may request that a MD execute a management action using an appropriate MF; and 5) based on application registration, the OAM and/or slice management system may accept and apply requested changes, reject the requested changes, and/or provide a counterproposal to the slice enabler application entity if such request is not feasible (e.g., due to lack of resources, conflicting requests).

As used herein, GST may refer to a set of attributes and/or parameters (e.g., supported throughput, supported functionality, provided APIs, etc.) that characterize any slice. The GST may contain attribute names, definitions, and/or units. Moreover, as used herein, NEST may be a GST filled with values and/or ranges based on specific vertical industry use cases.

In a first embodiment, a slice enabler server may trigger an NSI, NSSI, and/or NF modification. In the first embodiment, the slide enabler server (e.g., slice enabling application entity) may be a middleware and/or vertical application enabler server. As used herein, middleware may be the equivalent to a vertical application enabler (e.g., VAE, UAE, FAE, SEAL, and so forth).

Figure 4:
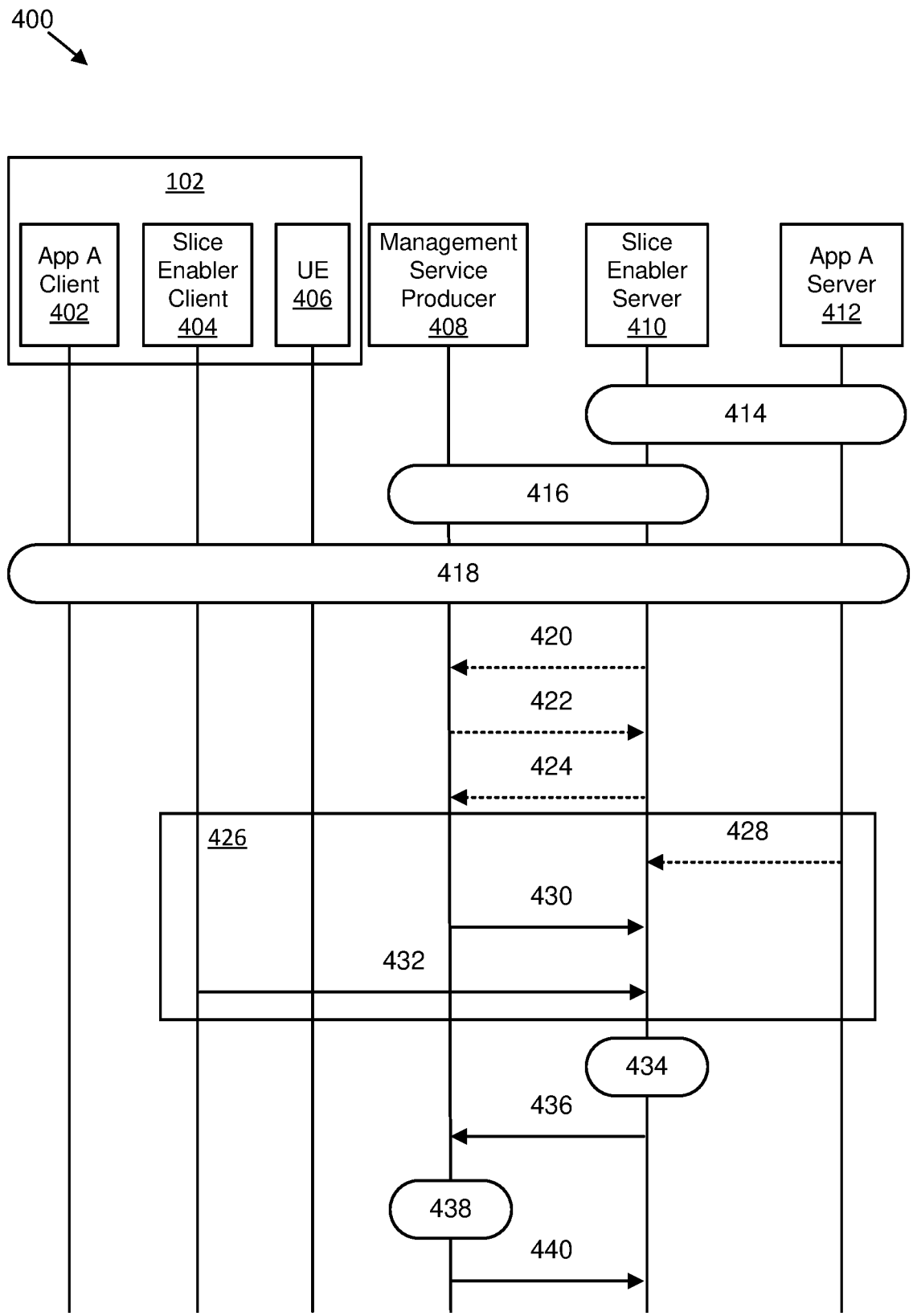
FIG. 4 is a communications diagram illustrating one embodiment of communications corresponding to a first embodiment.

FIG. 4 is a communications diagram illustrating one embodiment of communications 400 corresponding to the first embodiment. The communications 400 include messages transmitted between: a remote unit 102 comprising an application ("App") A client 402, a slice enabler client 404, and a UE 406; a management service producer 408 (e.g., OAM, slice management service producer); a slice enabler server 410; and an application A server 412. As may be appreciated, each communication described herein may include one or more messages.

In a first communication 414 transmitted between the slice enabler server 410 and the app A server 412, messages are transmitted for onboarding the app A server 412 to the slice enabler server 410 (e.g., SEAL server, VAL server).

In a second communication 416 transmitted between the management service producer 408 and the slice enabler server 410, the slice enabler server 410 becomes aware of supported slices and configuration parameters and/or GST/NEST attributes.

In a third communication 418 transmitted between the remote unit 102, the management service producer 408, the slice enabler server 410, and the app A server 412, UEs having app A client 402 are connected to a slice (e.g., Slice #1). For example, the management service producer 408 may have requested that the network instantiate a set of slices (e.g., Slice #1, Slice #2) which may be mapped to the users of app A for a given geographical area. Also, the UEs which are running App A may be registered and connected to 5GS via Slice #1.

In a fourth communication 420 optionally transmitted from the slice enabler server 410 to the management service producer 408, the slice enabler server 410 sends a subscription to the management service producer 408 (e.g., appropriate MnSs, MnS's that support subscription) which includes a configuration of a monitoring event report (e.g., by setting a threshold). This subscription may include one or more of the following parameters: an application ID, a service ID, a cell ID, a TA ID, a slice ID, NSI IDs, NSSI IDs, an MnS ID and requested permission for service, a time validity, a geographical area for which the request applies, and/or requested performance KPIs.

In a fifth communication 422 optionally transmitted from the management service producer 408 to the slice enabler server 410, the management service producer 408 transmits a notification and/or response to the fourth communication 420 to the slice enabler server 410 which includes a positive or negative ACK for the subscription and/or request. In certain embodiments, the management service producer 408 sends a POST request with a message body containing a {NotificationSubscription} data structure corresponding to the resource representing a subscription. The variable {NotificationSubscription} may define a subscribed event, a filtering criteria, and/or an address where a service consumer wishes to receive event notifications. In various embodiments, the management service producer 408 sends a "Created" response with a message body containing a data structure specific to a subscription. The data structure contains the address of the resource created and the subscribed event type.

In a sixth communication 424 optionally transmitted from the slice enabler server 410 to the management service producer 408, the slice enabler server 410 sends to one or more slice enabler clients (e.g., slice enabler client 404 via the management service producer 408), a trigger event report configuration message. In some embodiments, the trigger event report configuration message includes a request to slice enabler clients to monitor a communication link (e.g., loss rate<X) and to send a first report to the slice enabler server 410 if a first condition occurs. This condition may be related to a change of application QoS attributes, a change of application QoE attributes, a change of QoS conditions, a change of QoS resource conditions (e.g., as captured by an AS layer of the UE 406), a change of UE context, a change of UE mobility, and so forth.

In a seventh communication 426, a trigger event may be captured at the slice enabler server 410. An eighth communication 428, a ninth communication 430, and a tenth communication 432 illustrate three possible trigger event communications.

In the eighth communication 428 transmitted from the app A server 412 to the slice enabler server 410, the app A server 412 transmits a request to adapt application requirements to the slice enabler server 410. This request may include one or more of the following: a change of an automation level of the application, a change of a communication model, a change of a service profile mapped to the application, a change of service requirements mapped to the application; a change of a service area coverage for the application, and/or a change of application KPIs and/or QoE targets (e.g., due to changing a video encoding rate for video apps).

In the ninth communication 430 transmitted from the management service producer 408 to the slice enabler server 410, the management service producer 408 transmits a slice event report (e.g., based on a monitoring event configuration) to the slice enabler server 410. The slice event report may include: an NSI and/or NSSI congestion notification, an NSI and/or NSSI overload indication, an expected NSI and/or NSSI unavailability indication, a slice coverage change indication, an NSI and/or NSSI parameter modification indication, an NF modification indication, and/or performance triggers (e.g., appropriate performance triggers).

In the tenth communication 432 transmitted from the slice enabler client 404 to the slice enabler server 410, the slice enabler client 404 transmits a trigger event report (e.g., based on a configuration from the slice enabler server 410—such as a QoS metric<X %) to the slice enabler server 410. The trigger event report may include: UE IDs, an application ID, a service profile ID, new and/or modified service requirements, a QoE and/or QoS degradation notification, a UE mobility change notification, a degradation (e.g., or change) of application QoS attributes (e.g., reliability, latency, jitter, and so forth).

The slice enabler server 410 may decide 434 one or more of the following: a NEST modification, a CS modification, an NSI modification, an NSSI modification, or an NF modification for affected slices. In some embodiments, a criterion for selecting a management action may be to facilitate meeting application service requirements (e.g., QoE and/or QoS requirements, GST/NEST attributes) considering also slice availability and/or capabilities (e.g., RATs and/or frequencies supported per slice, application types supported per slice, and so forth).

In an eleventh communication 436 transmitted from the slice enabler server 410 to the management service producer 408, the slice enabler server 410 sends an NSI, NSSI, and/or NF modification request to one or more corresponding management service producers 408. This modification request may include one or more of the following: an NSI, NSSI, and/or NF ID; an MF and/or MnS ID, an application ID, a middleware, and/or an application enabler server ID (e.g., VAE server ID, FAE server ID, UAE server ID, SEAL ID); a cause for adaptation; an application type; an enforcement and/or recommendation flag; and/or a time and/or area of validity of the request. As used herein, an adaptation may refer to creation, removal, activation, deactivation, and/or modification.

The management service producer 408 may accept 438 and apply the requested adaptation.

In a twelfth communication 440 transmitted from the management service producer 408 to the slice enabler server 410, the management service producer 408 may send a positive ACK to the slice enabler server 410. In some embodiments, the management service producer 408 may reject the request and sends a negative result and/or may provide a counterproposal to the slice enabler server 410 if a request is not feasible (e.g., due to lack of resources, conflicting requests, and so forth).

In some embodiments, the slice enabler server 410 may also reside at an edge cloud and/or MEC platform. In such embodiments, the slice enabler server 410 may be equivalent to an EES or an ECS. If the slice enabler server 410 is an EES and/or an ECS, the slice enabler client 404 may be an EEC.

As used herein, EES may refer to an entity that provides supporting functions needed for Edge Application Servers and Edge Enabler Clients. The EES interacts with a 3GPP Core Network for accessing the capabilities of network functions and supports external exposure of 3GPP network capabilities to the Edge Application Servers.

Moreover, as used herein, EEC may refer to an entity that provides supporting functions needed for Application Clients, such as retrieval and provisioning of configuration information to enable the exchange of Application Data Traffic with an Edge Application Server, and discovery of Edge Application Servers available in an Edge Data Network.

Furthermore, as used herein, ECS may refer to an entity which may be part of a PLMN or a SP that provides supporting functions needed for the EEC to connect with an EES. These functionalities of ECS are related to the provisioning of edge configuration information to the EEC, which are used for establishing connection with EES.

In a second embodiment, an xApp may trigger an NSI, NSSI, and/or NF modification. In the second embodiment, a slice enabling application entity may be an xApp in O-RAN near RT RIC, an rApp in Non-RT RIC, or a RIC function.

In various embodiments, such as in O-RAN, management services may be consumed as API for third party applications, such as xApps and/or rApps. In certain embodiments, a functionality which serves as a slice enabler application entity may enable slice tailored management exposure for an application service provider and/or may interact with management systems and/or SMOs.

Figure 5:
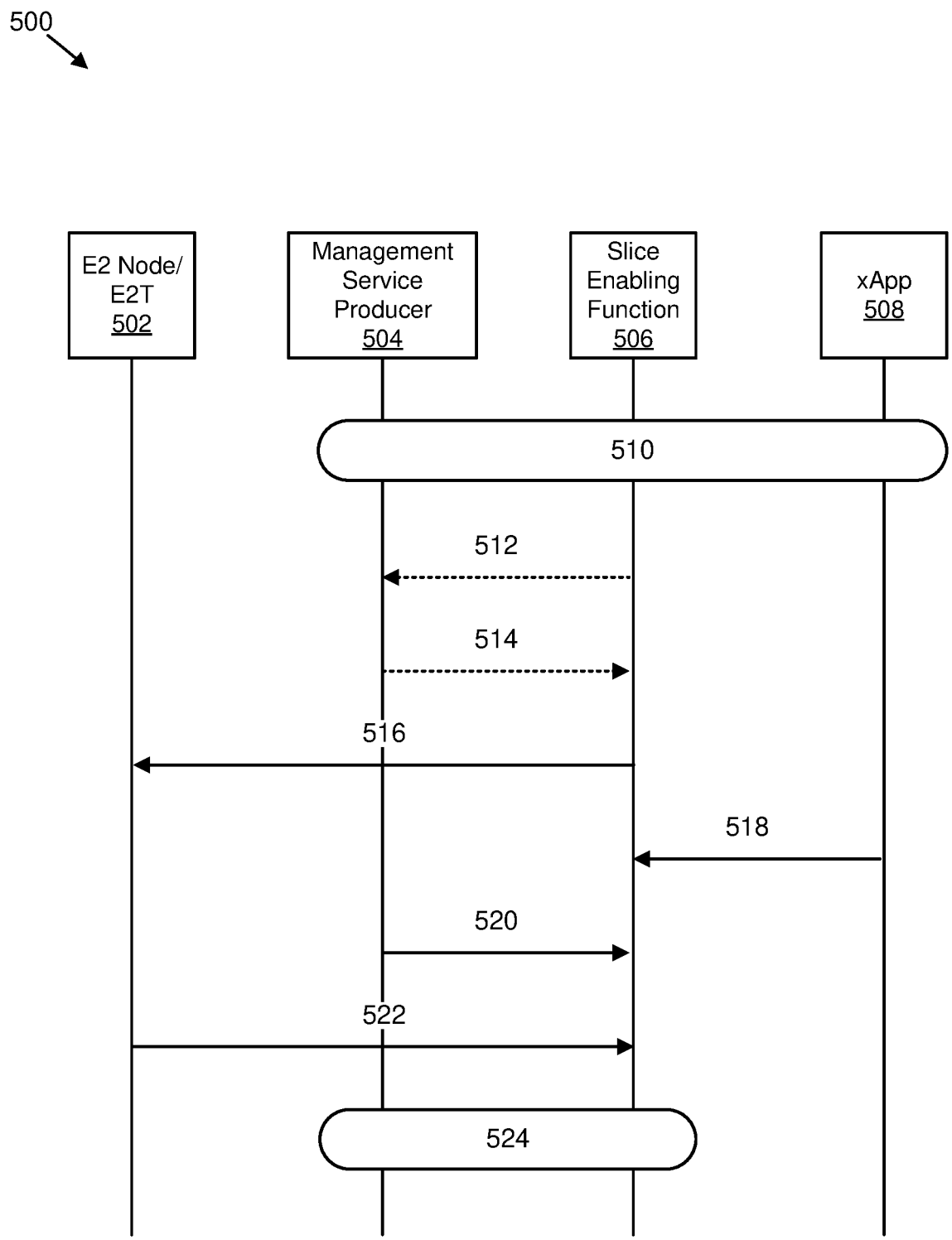
FIG. 5 is a communications diagram illustrating one embodiment of communications corresponding to a second embodiment.

FIG. 5 is a communications diagram illustrating one embodiment of communications 500 corresponding to the second embodiment. The communications 500 include messages transmitted between an E2 node/E2T 502 (e.g., RAN node), a management service producer 504 (e.g., MnS, SMO, near RT-RIC), a slice enabling function 506 (e.g., xApp RIC function, rApp RIC function, slice enabling application function), and an xApp 508 (e.g., or rApp), such as in an O-RAN system. As may be appreciated, each communication described herein may include one or more messages.

In a first communication 510 transmitted between the management service producer 504, the slice enabling function 506, and the xApp 508, slices may be instantiated for corresponding applications (e.g., app to slice mapping may be provided). The xApp 508 may be registered and/or may be aware of offered network slices.

In a second communication 512 optionally transmitted from the slice enabling function 506 to the management service producer 504, the slice enabling function 506 sends a subscription to the management service producer 504 (e.g., one or more MnS's that support subscription) including the configuration of a monitoring event report (e.g., by setting a threshold such as using a performance threshold monitoring service producer). The subscription may also be provided to an API management service that enables the discovery of an MnS API by the xApp 508. This subscription may include one or more of the following parameters: an xApp ID, an rApp ID, a service ID, an O-RAN cell ID, a slice ID, a RIC ID, NSI IDs, NSSI IDs, an MnS ID and/or requested permission for the service; a validity time; a geographical area for which the request applies, and/or requested performance KPIs.

In a third communication 514 optionally transmitted from the management service producer 504 to the slice enabling function 506, the management service producer 504 transmits a notification and/or response to the slice enabling function 506 which includes a positive or negative ACK for the subscription.

In a fourth communication 516 optionally transmitted from the slice enabling function 506 to the E2 node/E2T 502, the slice enabling function 506 sends to the E2 node/E2T 502 a trigger event report configuration message which includes a request to monitor RAN or UE related performance KPIs and to send a report to the slice enabling function 506 if a condition occurs. The condition may be related to change of QoS resource conditions, a change of RAN resource conditions, and/or a change of UE context (e.g., change of UE mobility).

In various embodiments, a trigger event may be captured at the slice enabling function 506. A fifth communication 518, a sixth communication 520, and a seventh communication 522 illustrate three possible trigger event communications.

In the fifth communication 518 transmitted from the xApp 508 to the slice enabling function 506, the xApp 508 transmits a request to adapt application requirements to the slice enabling function 506. This request may include one or more of the following: change of an automation level of the application, a change of a communication model, a change of a service profile mapped to the application, a change of service requirements mapped to the application; a change of a service area coverage for the application, a change of application KPIs and/or QoE targets (e.g., due to changing a video encoding rate for video apps); a new and/or modified traffic steering control or policy requirement (e.g., cell re-selection with or without frequency change); a new and/or modified QoS and/or QoE control or policy requirement (e.g., adaptation of resource allocation, interference management scheme, bearer modification, and so forth); and or other xApp-triggered optimization outcomes (e.g., load balancing optimization, interference management optimization, energy efficiency optimization, mobility control optimization).

In the sixth communication 520 transmitted from the management service producer 504 to the slice enabling function 506, the management service producer 504 transmits a slice monitoring event report to the slice enabling function 506. The slice monitoring event report may include: an NSI and/or NSSI congestion notification, an NSI and/or NSSI overload indication, an expected NSI and/or NS SI unavailability indication, a slice coverage change indication, an NSI and/or NSSI parameter modification indication, an NF modification indication, and/or performance triggers (e.g., appropriate performance triggers).

In the seventh communication 522 transmitted from the E2 node/E2T 502 to the slice enabling function 506, the E2 node/E2T 502 transmits a RAN slice context change to the slice enabling function 506. The RAN slice context change may include one or more of the following parameters: a RAN ID; a slice ID for a slice; a UE ID; a group of UEs ID; a 5QI load change indication for a RAN device and/or the slice; a RAN performance degradation (e.g., performance change) for the RAN device and/or the slice; a resource conditions and/or an availability change for the RAN device and/or the slice; RAT and/or frequency conditions and/or an availability change for the RAN device and/or the slice; a high interference indication for the RAN device and/or the slice; a UE context change; a UE performance change; a group of UEs context change; and/or a group of UEs performance change.

In an eighth communication 524 transmitted between the management service producer 504 and the slice enabling function 506, the slice enabling function 506 may decide one or more of the following: a NEST modification, a CS modification, an NSI modification, an NSSI modification, or an NF modification for affected slices. In some embodiments, a criterion for selecting a management action may be to facilitate meeting application service requirements (e.g., QoE and/or QoS requirements, GST parameters) considering also slice availability and/or capabilities (e.g., RATs and/or frequencies supported per slice, application types supported per slice, and so forth).

In the eighth communication 524, the slice enabling function 506 sends an NSI, NSSI, and/or NF modification request to one or more corresponding management service producers 504. This modification request may include one or more of the following: an NSI, NSSI, and/or NF ID; an MF and/or MnS ID, an application ID, a middleware, and/or an application enabler server ID (e.g., VAE server ID, FAE server ID, UAE server ID, SEAL server ID); a cause for adaptation; an application type; an enforcement and/or recommendation flag; and/or a time and/or area of validity of the request.

The management service producer 504 may accept and apply the requested change.

In the eighth communication 524, the management service producer 504 may send a positive ACK to the slice enabling function 506. In some embodiments, the management service producer 504 may reject the request and sends a negative result and/or may provide a counterproposal to the slice enabling function 506 if a request is not feasible (e.g., due to lack of resources, conflicting requests, and so forth).

Figure 6:
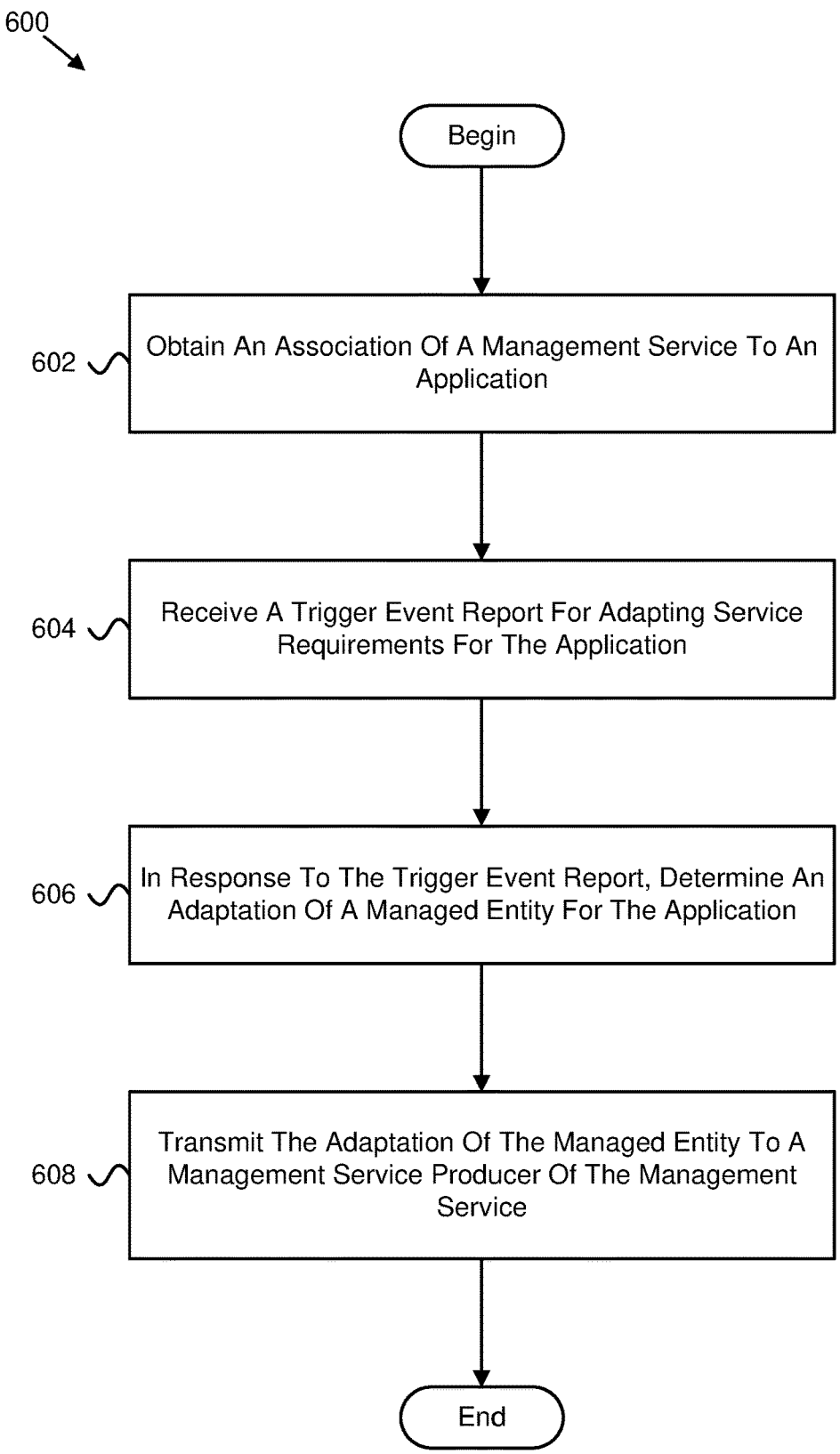
FIG. 6 is a flow chart diagram illustrating one embodiment of a method for adapting a managed entity for an application.

FIG. 6 is a flow chart diagram illustrating one embodiment of a method 600 for adapting a managed entity for an application. In some embodiments, the method 600 is performed by an apparatus, such as the network unit 104. In certain embodiments, the method 600 may be performed by a processor executing program code, for example, a microcontroller, a microprocessor, a CPU, a GPU, an auxiliary processing unit, a FPGA, or the like.

In various embodiments, the method 600 includes obtaining 602 an association of a management service to an application. In some embodiments, the method 600 includes receiving 604 a trigger event report for adapting service requirements for the application. In various embodiments, the method 600 includes, in response to the trigger event report, determining 606 an adaptation of a managed entity for the application. In certain embodiments, the method 600 includes transmitting 608 the adaptation of the managed entity to a management service producer of the management service.

In certain embodiments, the method 600 further comprises transmitting a trigger event report configuration message to a device to configure the device to transmit the trigger event report. In some embodiments, receiving the trigger event report comprises receiving the trigger event report from an application server, and the trigger event report comprises a change in an automation level of the application, a change in a communication model, a change of a service profile mapped to the application, a change in a service requirement mapped to the application, a change in a service area coverage for the application, a change in key performance indicators of the application, a change in quality of service requirements, or some combination thereof.

In various embodiments, receiving the trigger event report comprises receiving the trigger event report from the management service producer for at least one network slice instance, at least one network slice subnet instance, or a combination thereof, and the trigger event report comprises a congestion notification, an overload indication, an unavailability indication, a coverage change indication, a parameter modification indication, a network function modification indication, a performance trigger, a radio resource management policy adaption for a network slice subnet instance, or some combination thereof. In one embodiment, receiving the trigger event report comprises receiving the trigger event report from a slice enabler client of a user equipment, and the trigger event report comprises a user equipment identifier, an application identifier, a service profile identifier, service requirements, a quality of service change notification, a user equipment mobility change notification, a change in application quality of service attributes, or some combination thereof.

In certain embodiments, determining the configuration comprises determining a network slice type modification, a communication service modification, a network slice instance modification, a network slice subnet instance modification, a network function modification, or some combination thereof. In some embodiments, the configuration comprises a managed entity identifier, a management service producer identifier, an application identifier, a middleware identifier, an application enabler server identifier, a cause for adaption, an application type, an enforcement flag, a recommendation flag, a time of validity, an area of validity, or some combination thereof.

In various embodiments, receiving the trigger event report comprises receiving the trigger event report from the application, and the trigger event report comprises a change in an automation level of the application, a change in a communication model, a change of a service profile associated with the application, a change in a service requirement mapped to the application, a change in a service area coverage for the application, a change in measured key performance indicators of the managed entity associated with the application, a change in quality of service requirements, a traffic steering control requirement, a traffic steering policy requirement, a quality of service control requirement, a quality of service policy requirement, a quality of experience control requirement, a quality of experience policy requirement, an application trigger optimization, or some combination thereof.

In one embodiment, receiving the trigger event report comprises receiving the trigger event report from a radio access network device, and the trigger event report comprises a radio access network identifier, a slice identifier, a user equipment identifier, a group of user equipments identifier, a load change for the radio access network device, a load change for a slice, a performance change for the radio access network device, a performance change for the slice, a resource condition change for the radio access network device, a resource condition change for the slice, an availability change for the radio access network device, an availability change for the slice, a radio access technology change for the radio access network device, a radio access technology change for the slice, a frequency change for the radio access network device, a frequency change for the slice, an interference indication for the radio access network device, an interference indication for the slice, a user equipment context change, a user equipment performance change, a group of user equipments context change, a group of user equipments performance change, or some combination thereof.

In certain embodiments, the service requirements comprise application requirements, management service requirements, communication requirements or some combination thereof, and wherein the service requirements apply for a user equipment, a radio access network, a network slice instance, a network slice subnet instance, a network function, or some combination thereof.

In one embodiment, a method comprises: obtaining an association of a management service to an application; receiving a trigger event report for adapting service requirements for the application; in response to the trigger event report, determining an adaptation of a managed entity for the application; and transmitting the adaptation of the managed entity to a management service producer of the management service.

In certain embodiments, the method further comprises transmitting a trigger event report configuration message to a device to configure the device to transmit the trigger event report.

In some embodiments, receiving the trigger event report comprises receiving the trigger event report from an application server, and the trigger event report comprises a change in an automation level of the application, a change in a communication model, a change of a service profile mapped to the application, a change in a service requirement mapped to the application, a change in a service area coverage for the application, a change in key performance indicators of the application, a change in quality of service requirements, or some combination thereof.

In various embodiments, receiving the trigger event report comprises receiving the trigger event report from the management service producer for at least one network slice instance, at least one network slice subnet instance, or a combination thereof, and the trigger event report comprises a congestion notification, an overload indication, an unavailability indication, a coverage change indication, a parameter modification indication, a network function modification indication, a performance trigger, a radio resource management policy adaption for a network slice subnet instance, or some combination thereof.

In one embodiment, receiving the trigger event report comprises receiving the trigger event report from a slice enabler client of a user equipment, and the trigger event report comprises a user equipment identifier, an application identifier, a service profile identifier, service requirements, a quality of service change notification, a user equipment mobility change notification, a change in application quality of service attributes, or some combination thereof.

In certain embodiments, determining the configuration comprises determining a network slice type modification, a communication service modification, a network slice instance modification, a network slice subnet instance modification, a network function modification, or some combination thereof.

In some embodiments, the configuration comprises a managed entity identifier, a management service producer identifier, an application identifier, a middleware identifier, an application enabler server identifier, a cause for adaption, an application type, an enforcement flag, a recommendation flag, a time of validity, an area of validity, or some combination thereof.

In various embodiments, receiving the trigger event report comprises receiving the trigger event report from the application, and the trigger event report comprises a change in an automation level of the application, a change in a communication model, a change of a service profile associated with the application, a change in a service requirement mapped to the application, a change in a service area coverage for the application, a change in measured key performance indicators of the managed entity associated with the application, a change in quality of service requirements, a traffic steering control requirement, a traffic steering policy requirement, a quality of service control requirement, a quality of service policy requirement, a quality of experience control requirement, a quality of experience policy requirement, an application trigger optimization, or some combination thereof.

In one embodiment, receiving the trigger event report comprises receiving the trigger event report from a radio access network device, and the trigger event report comprises a radio access network identifier, a slice identifier, a user equipment identifier, a group of user equipments identifier, a load change for the radio access network device, a load change for a slice, a performance change for the radio access network device, a performance change for the slice, a resource condition change for the radio access network device, a resource condition change for the slice, an availability change for the radio access network device, an availability change for the slice, a radio access technology change for the radio access network device, a radio access technology change for the slice, a frequency change for the radio access network device, a frequency change for the slice, an interference indication for the radio access network device, an interference indication for the slice, a user equipment context change, a user equipment performance change, a group of user equipments context change, a group of user equipments performance change, or some combination thereof.

In certain embodiments, the service requirements comprise application requirements, management service requirements, communication requirements or some combination thereof, and wherein the service requirements apply for a user equipment, a radio access network, a network slice instance, a network slice subnet instance, a network function, or some combination thereof.

In one embodiment, an apparatus comprises: a processor that obtains an association of a management service to an application; a receiver that receives a trigger event report for adapting service requirements for the application; and a transmitter; wherein: the processor that, in response to the trigger event report, determines an adaptation of a managed entity for the application; and the transmitter that transmits the adaptation of the managed entity to a management service producer of the management service.

In certain embodiments, the transmitter transmits a trigger event report configuration message to a device to configure the device to transmit the trigger event report.

In some embodiments, the receiver receiving the trigger event report comprises the receiver receiving the trigger event report from an application server, and the trigger event report comprises a change in an automation level of the application, a change in a communication model, a change of a service profile mapped to the application, a change in a service requirement mapped to the application, a change in a service area coverage for the application, a change in key performance indicators of the application, a change in quality of service requirements, or some combination thereof.

In various embodiments, the receiver receiving the trigger event report comprises the receiver receiving the trigger event report from the management service producer for at least one network slice instance, at least one network slice subnet instance, or a combination thereof, and the trigger event report comprises a congestion notification, an overload indication, an unavailability indication, a coverage change indication, a parameter modification indication, a network function modification indication, a performance trigger, a radio resource management policy adaption for a network slice subnet instance, or some combination thereof.

In one embodiment, the receiver receiving the trigger event report comprises the receiver receiving the trigger event report from a slice enabler client of a user equipment, and the trigger event report comprises a user equipment identifier, an application identifier, a service profile identifier, service requirements, a quality of service change notification, a user equipment mobility change notification, a change in application quality of service attributes, or some combination thereof.

In certain embodiments, the processor determining the configuration comprises the processor determining a network slice type modification, a communication service modification, a network slice instance modification, a network slice subnet instance modification, a network function modification, or some combination thereof.

In some embodiments, the configuration comprises a managed entity identifier, a management service producer identifier, an application identifier, a middleware identifier, an application enabler server identifier, a cause for adaption, an application type, an enforcement flag, a recommendation flag, a time of validity, an area of validity, or some combination thereof.

In various embodiments, the receiver receiving the trigger event report comprises the receiver receiving the trigger event report from the application, and the trigger event report comprises a change in an automation level of the application, a change in a communication model, a change of a service profile associated with the application, a change in a service requirement mapped to the application, a change in a service area coverage for the application, a change in measured key performance indicators of the managed entity associated with the application, a change in quality of service requirements, a traffic steering control requirement, a traffic steering policy requirement, a quality of service control requirement, a quality of service policy requirement, a quality of experience control requirement, a quality of experience policy requirement, an application trigger optimization, or some combination thereof.

In one embodiment, the receiver receiving the trigger event report comprises the receiver receiving the trigger event report from a radio access network device, and the trigger event report comprises a radio access network identifier, a slice identifier, a user equipment identifier, a group of user equipments identifier, a load change for the radio access network device, a load change for a slice, a performance change for the radio access network device, a performance change for the slice, a resource condition change for the radio access network device, a resource condition change for the slice, an availability change for the radio access network device, an availability change for the slice, a radio access technology change for the radio access network device, a radio access technology change for the slice, a frequency change for the radio access network device, a frequency change for the slice, an interference indication for the radio access network device, an interference indication for the slice, a user equipment context change, a user equipment performance change, a group user equipments context change, a group of user equipments performance change, or some combination thereof.

In certain embodiments, the service requirements comprise application requirements, management service requirements, communication requirements or some combination thereof, and wherein the service requirements apply for a user equipment, a radio access network, a network slice instance, a network slice subnet instance, a network function, or some combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed at a first network entity, the method comprising:
   obtaining, at the first network entity, an association of a management service to an application;
   receiving, from a second network entity different than the first network entity, a trigger event report for adapting service requirements for the application;
   in response to the trigger event report, determining, by the first network entity, an adaptation of a managed entity for the application;
   transmitting, from the first network entity, the adaptation of the managed entity to a management service producer of the management service; and
   determining a configuration comprising a network slice type modification, a communication service modification, a network slice instance modification, a network slice subnet instance modification, or a network function modification, or a combination thereof, wherein the configuration comprises a managed entity identifier (ID), a management service producer ID, an application ID, a middleware ID, an application enabler server ID, a cause for adaption, an application type, an enforcement flag, a recommendation flag, a time of validity, or an area of validity, or a combination thereof.

2. The method of claim 1, further comprising transmitting a trigger event report configuration message to a device to configure the device to transmit the trigger event report.

3. The method of claim 1, wherein receiving the trigger event report comprises:
   receiving the trigger event report from the second network entity,
   wherein the second network entity comprises an application server, and
   wherein the trigger event report comprises a change in an automation level of the application, a change in a communication model, a change of a service profile mapped to the application, a change in a service requirement mapped to the application, a change in a service area coverage for the application, a change in key performance indicators of the application, or a change in quality requirements, or a combination thereof.

4. The method of claim 1, wherein receiving the trigger event report comprises:
   receiving the trigger event report from the management service producer for at least one network slice instance, or at least one network slice subnet instance, or both,
   wherein the trigger event report comprises a congestion notification, an overload indication, an unavailability indication, a coverage change indication, a parameter modification indication, a network function modification indication, a performance trigger, or a radio resource management policy adaption for a network slice subnet instance, or a combination thereof.

5. The method of claim 1, wherein receiving the trigger event report comprises:
   receiving the trigger event report from a slice enabler client of a user equipment (UE),
   wherein the trigger event report comprises a UE identifier (ID), an application ID, a service profile ID, service requirements, a quality notification, a UE mobility change notification, or a change in application quality attributes, or a combination thereof.

6. The method of claim 1, wherein receiving the trigger event report comprises:
   receiving the trigger event report from the application,
   wherein the trigger event report comprises a change in an automation level of the application, a change in a communication model, a change of a service profile associated with the application, a change in a service requirement mapped to the application, a change in a service area coverage for the application, a change in measured key performance indicators of the managed entity associated with the application, a change in quality of service (QOS) requirements, a traffic steering control requirement, a traffic steering policy requirement, a QoS control requirement, a QoS policy requirement, a quality of experience (QoE) control requirement, a QoE policy requirement, or an application trigger optimization, or a combination thereof.

7. The method of claim 1, wherein receiving the trigger event report comprises:
   receiving the trigger event report from a radio access network (RAN) device,
   wherein the trigger event report comprises a RAN identifier (ID), a slice ID, a user equipment (UE) ID, a group of UE ID, a load change for the RAN device, a load change for a slice, a performance change for the RAN device, a performance change for the slice, a resource condition change for the RAN device, a resource condition change for the slice, an availability change for the RAN device, an availability change for the slice, a radio access technology change for the RAN device, a radio access technology change for the slice, a frequency change for the RAN device, a frequency change for the slice, an interference indication for the RAN device, an interference indication for the slice, a UE context change, a UE performance change, a group of UE context change, or a group of UE performance change, or a combination thereof.

8. The method of claim 1, wherein the service requirements comprise application requirements, management service requirements, communication requirements or a combination thereof, and wherein the service requirements apply for a user equipment (UE), a radio access network (RAN), a network slice instance, a network slice subnet instance, or a network function, or a combination thereof.

9. A first network entity comprising:
at least one memory; and
at least one processor coupled with the at least one memory and configured to cause the first network entity to:
obtain, at the first network entity, an association of a management service to an application;
receive, from a second network entity different than the first network entity, a trigger event report for adapting service requirements for the application;
in response to the trigger event report, determine, at the first network entity, an adaptation of a managed entity for the application;
transmit, from the first network entity, the adaptation of the managed entity to a management service producer of the management service; and
determine a configuration comprising a network slice type modification, a communication service modification, a network slice instance modification, a network slice subnet instance modification, or a network function modification, or a combination thereof, wherein the configuration comprises a managed entity identifier (ID), a management service producer ID, an application ID, a middleware ID, an application enabler server ID, a cause for adaption, an application type, an enforcement flag, a recommendation flag, a time of validity, or an area of validity, or a combination thereof.

10. The first network entity of claim 9, wherein the at least one processor is configured to cause the first network entity to transmit a trigger event report configuration message to a device to configure the device to transmit the trigger event report.

11. The first network entity of claim 9, wherein the at least one processor is configured to cause the first network entity to receive the trigger event report from the second network entity,
wherein the second network entity comprises an application server, and
wherein the trigger event report comprises a change in an automation level of the application, a change in a communication model, a change of a service profile mapped to the application, a change in a service requirement mapped to the application, a change in a service area coverage for the application, a change in key performance indicators of the application, or a change in quality requirements, or a combination thereof.

12. The first network entity of claim 9, wherein receiving the trigger event report comprises:
receiving the trigger event report from the management service producer for at least one network slice instance, or at least one network slice subnet instance, or both, wherein the trigger event report comprises a congestion notification, an overload indication, an unavailability indication, a coverage change indication, a parameter modification indication, a network function modification indication, a performance trigger, or a radio resource management policy adaption for a network slice subnet instance, or a combination thereof.

13. The first network entity of claim 9, wherein receiving the trigger event report comprises:
receiving the trigger event report from a slice enabler client of a user equipment (UE),
wherein the trigger event report comprises a UE identifier (ID), an application ID, a service profile ID, service requirements, a quality notification, a UE mobility change notification, or a change in application quality attributes, or a combination thereof.

14. The first network entity of claim 9, wherein receiving the trigger event report comprises:
receiving the trigger event report from the application,
wherein the trigger event report comprises a change in an automation level of the application, a change in a communication model, a change of a service profile associated with the application, a change in a service requirement mapped to the application, a change in a service area coverage for the application, a change in measured key performance indicators of the managed entity associated with the application, a change in quality of service (QOS) requirements, a traffic steering control requirement, a traffic steering policy requirement, a QoS control requirement, a QoS policy requirement, a quality of experience (QoE) control requirement, a QoE policy requirement, or an application trigger optimization, or a combination thereof.

15. The first network entity of claim 9, wherein receiving the trigger event report comprises:
receiving the trigger event report from a radio access network (RAN) device,
wherein the trigger event report comprises a RAN identifier (ID), a slice ID, a user equipment (UE) ID, a group of UE ID, a load change for the RAN device, a load change for a slice, a performance change for the RAN device, a performance change for the slice, a resource condition change for the RAN device, a resource condition change for the slice, an availability change for the RAN device, an availability change for the slice, a radio access technology change for the RAN device, a radio access technology change for the slice, a frequency change for the RAN device, a frequency change for the slice, an interference indication for the RAN device, an interference indication for the slice, a UE context change, a UE performance change, a group of UE context change, or a group of UE performance change, or a combination thereof.

16. The first network entity of claim 9, wherein the service requirements comprise application requirements, management service requirements, communication requirements or a combination thereof, and wherein the service requirements apply for a user equipment (UE), a radio access network (RAN), a network slice instance, a network slice subnet instance, or a network function, or a combination thereof.

* * * * *